UNITED STATES PATENT OFFICE.

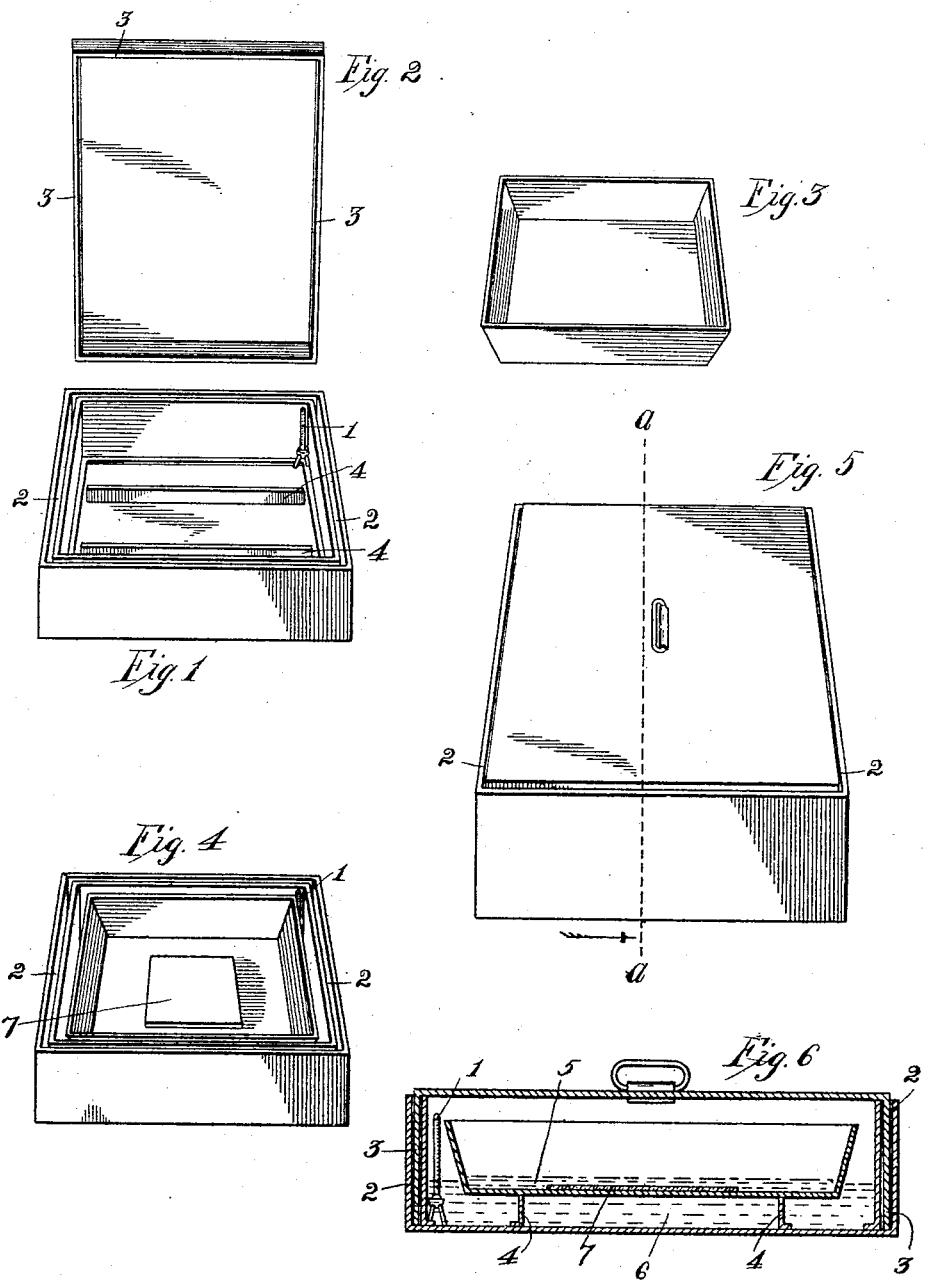

ZACHARIAH J. GOLD, OF STELLA, MISSOURI, ASSIGNOR OF ONE-HALF TO WILLIAM M. NEWTON, OF NEWTON COUNTY, MISSOURI.

PHOTOGRAPHER'S APPARATUS.

No. 906,491.     Specification of Letters Patent.     Patented Dec. 8, 1908.

Application filed March 30, 1908. Serial No. 424,151.

*To all whom it may concern:*

Be it known that I, ZACHARIAH J. GOLD, of Stella, county of Newton, and State of Missouri, have invented an Improvement in Photographers' Apparatus, consisting of a dark-pan for holding a developing-tray and to regulate the temperature therein; and I have assigned an undivided one-half interest in said invention to William M. Newton, of Granby, county of Newton, and State of Missouri.

The object of my invention is to produce a receptacle wherein photographers' plates may be developed in as near absolute darkness as practicable and to render more certain and safer such development than is now commonly practiced in a dark-room where no dark pan is used as auxiliary. To accomplish this I construct a pan preferably of metal, papier-mâché, wood-fiber, porcelain, rubber, or any other suitable and desirable material and the following specification together with the drawings will describe fully how to make and use my invention.

In the drawings Figure 1. is a perspective view of dark pan showing two bars attached to the bottom of said dark-pan but not to the sides thereof, on which to set the developing tray Fig. 3, and thermometer 1, for noting the temperature of the fluids in the pan and in the developing tray when used together and 2, the groove space between the sides for receiving the rim of the lid when it is in place to close out the light from the contents of the dark-pan. Fig. 2, is a perspective view of a cover for the dark-pan showing the rim 3, which fits in the groove 2. Fig. 3, is a perspective view of a photographer's developing tray. Fig. 4, is a perspective view showing a developing tray resting on the bars and a picture in the developing tray. Fig. 5, is a perspective view of cover Fig. 2, placed down over the dark-pan to exclude light. Fig. 6, shows a cross-section of Fig. 5 on dotted line *a—a*.

The cooling water is 6, and 1, is a thermometer resting in the water in a tripod support; and 7, a picture negative.

Referring to the drawing Fig. 1 shows the dark-pan constructed preferably in rectilinear form with double sides perpendicular to the bottom made of metal or other suitable material, having space between said sides extending uninterruptedly around said dark-pan and from the top edges of the dark-pan to the bottom so that the lid which is made of a corresponding form but some smaller, will fit over said pan and the rim cover thereof slip entirely down to the bottom of the dark-pan to exclude the light from the inside of the dark-pan; the dark-pan should be made water tight and to exclude light as much as practicable; hence I have the double sides entirely around the pan and when the lid is fitted down it is practically dark within the box where the developing tray rests; the bars 4, are preferably soldered to the inside of the bottom of the dark-pan and not touching the sides thereof thus allowing for the agitation of the water regulating the temperature in the dark-pan, but breaking the flow so that the water is not likely to flow over into the developer in the developing tray. When in use the thermometer 1, Fig. 1, rests in a tripod base and is immersed in the cooling water which covers part way up the sides of the developing tray that contains the developer see Fig. 4 where a picture 7, is shown resting in the bottom of the tray showing the pieces in place but not showing the water in the dark-pan nor the fluid developer in the tray for this is not deemed necessary, but in Fig. 6, the fluid lines may be seen 5, showing Gold and Newton's developer; and 6, cooling water about the tray.

What I claim is:

1. A photographer's dark-pan and cover said dark-pan having double and hollow sides and the rim of said cover adapted to fit in between said hollow sides substantially as and for the purpose specified.

2. A photographer's dark-pan and cover said dark-pan having double and hollow sides and the rim of said cover adapted to fit in between said hollow sides and bars on the bottom thereof substantially as and for the purpose specified.

3. A photographer's dark-pan and cover said dark-pan having double and hollow sides and bars on the bottom thereof in combination with a developing tray and thermometer substantially as described and for the purpose specified.

ZACHARIAH J. GOLD.

Witnesses:
    J. R. SMITH,
    JOHN EDMONDSON.